US012673716B2

(12) United States Patent
Johnson et al.

(10) Patent No.: US 12,673,716 B2
(45) Date of Patent: Jul. 7, 2026

(54) CONVERTIBLE COCKPIT

(71) Applicant: Thor Tech, Inc., Elkhart, IN (US)

(72) Inventors: Mitchell Johnson, Elkhart, IN (US); Dustin Feller, Elkhart, IN (US); Lea Smith, Elkhart, IN (US)

(73) Assignee: Thor Tech, Inc., Elkhart, IN (US)

( * ) Notice: Subject to any disclaimer, the term of this patent is extended or adjusted under 35 U.S.C. 154(b) by 0 days.

(21) Appl. No.: 19/188,487

(22) Filed: Apr. 24, 2025

(65) Prior Publication Data

US 2025/0340239 A1     Nov. 6, 2025

Related U.S. Application Data

(60) Provisional application No. 63/641,588, filed on May 2, 2024.

(51) Int. Cl.
B62D 1/183 (2006.01)
B60K 37/00 (2006.01)

(52) U.S. Cl.
CPC .............. B62D 1/183 (2013.01); B60K 37/00 (2013.01)

(58) Field of Classification Search
CPC ....................................................... B60K 37/00
See application file for complete search history.

(56) References Cited

U.S. PATENT DOCUMENTS

| | | | |
|---|---|---|---|
| 11,738,795 B1 | 8/2023 | Hitzinger | |
| 2020/0216110 A1* | 7/2020 | Redeker ................. | B60K 35/53 |
| 2024/0025322 A1* | 1/2024 | Salter .................... | B60K 35/22 |
| 2024/0025468 A1* | 1/2024 | Kobayashi ............. | B62D 1/181 |

FOREIGN PATENT DOCUMENTS

| | | | | |
|---|---|---|---|---|
| DE | 102018210924 A1 * | 3/2019 | ............. | B62D 1/183 |
| DE | 102018210924 B4 | 6/2020 | | |
| DE | 102020121763 A1 * | 2/2022 | ............. | B60K 35/60 |
| FR | 2861657 A1 * | 5/2005 | ......... | B60R 11/0235 |
| FR | 2861657 B1 | 1/2007 | | |

(Continued)

OTHER PUBLICATIONS

KR-20250107507-A Machine English Translation (Year: 2024).*

(Continued)

*Primary Examiner* — Jason D Shanske
*Assistant Examiner* — Matthew James O'Neill
(74) *Attorney, Agent, or Firm* — DINSMORE & SHOHL LLP

(57) ABSTRACT

Certain aspects of the disclosure provide an RV comprising a convertible cockpit having a driver position, comprising a convertible dashboard configurable to positions, the positions comprising a compressed position and an expanded position, at least a portion of the dashboard being closer in distance on a longitudinal axis to the driver position in the compressed position than in the expanded position, the convertible dashboard comprising a slit portion for placing a steering wheel apparatus, wherein the slit portion runs on the longitudinal axis across a portion of the convertible dashboard; and a steering wheel apparatus comprising a steering column or a steering wheel, wherein the steering wheel apparatus is movable along a length of the slit portion in several positions comprising a driving position or a stowing position.

21 Claims, 11 Drawing Sheets

(56)         References Cited

FOREIGN PATENT DOCUMENTS

FR         2943961  A1     10/2010
KR      20250107507  A   *   7/2025   .............. H02J 50/10

OTHER PUBLICATIONS

DE-102018210924-A1 (Year: 2018).*
FR-2861657-A1 (Year: 2003).*
DE-102020121763-A1 (Year: 2020).*
PCT International Search Report and Written Opinion of Commonly Owned International Patent Application PCT/US2025/027247, mailed Sep. 10, 2025, 18 pages, International Searching Authority (EPO).

* cited by examiner

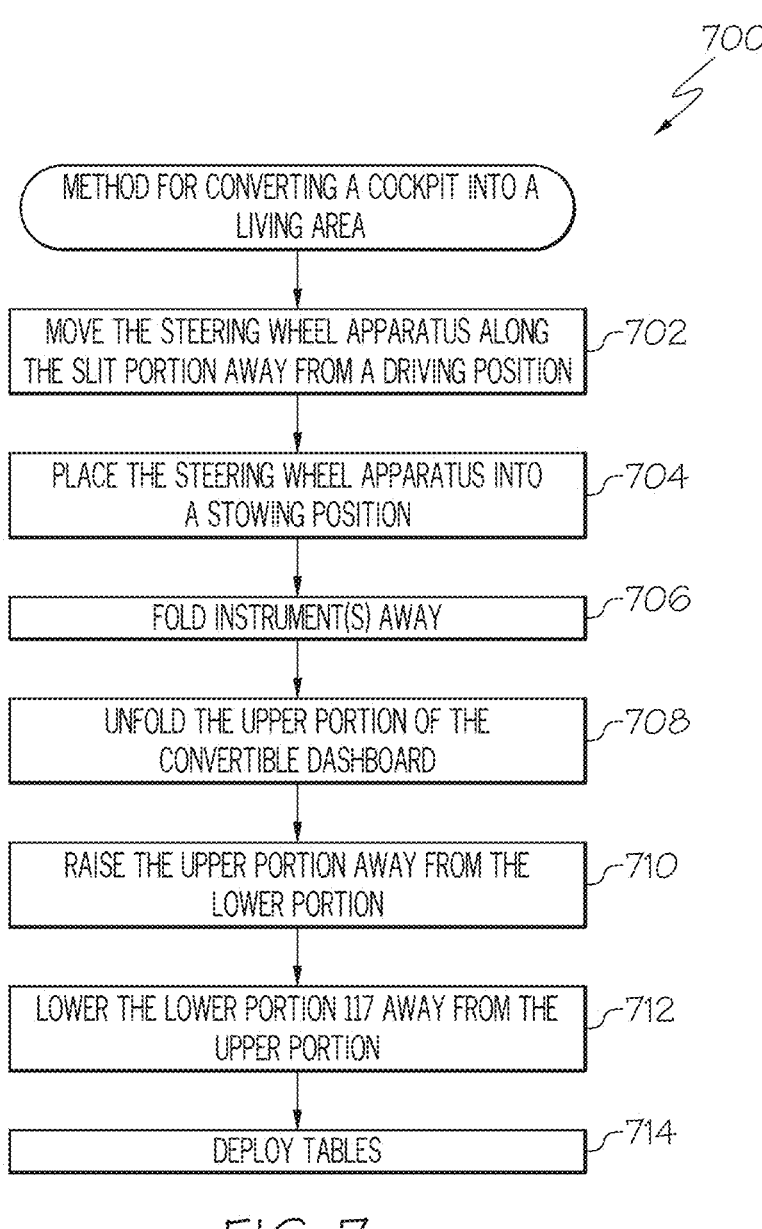

700

METHOD FOR CONVERTING A COCKPIT INTO A LIVING AREA

MOVE THE STEERING WHEEL APPARATUS ALONG THE SLIT PORTION AWAY FROM A DRIVING POSITION — 702

PLACE THE STEERING WHEEL APPARATUS INTO A STOWING POSITION — 704

FOLD INSTRUMENT(S) AWAY — 706

UNFOLD THE UPPER PORTION OF THE CONVERTIBLE DASHBOARD — 708

RAISE THE UPPER PORTION AWAY FROM THE LOWER PORTION — 710

LOWER THE LOWER PORTION 117 AWAY FROM THE UPPER PORTION — 712

DEPLOY TABLES — 714

FIG. 7

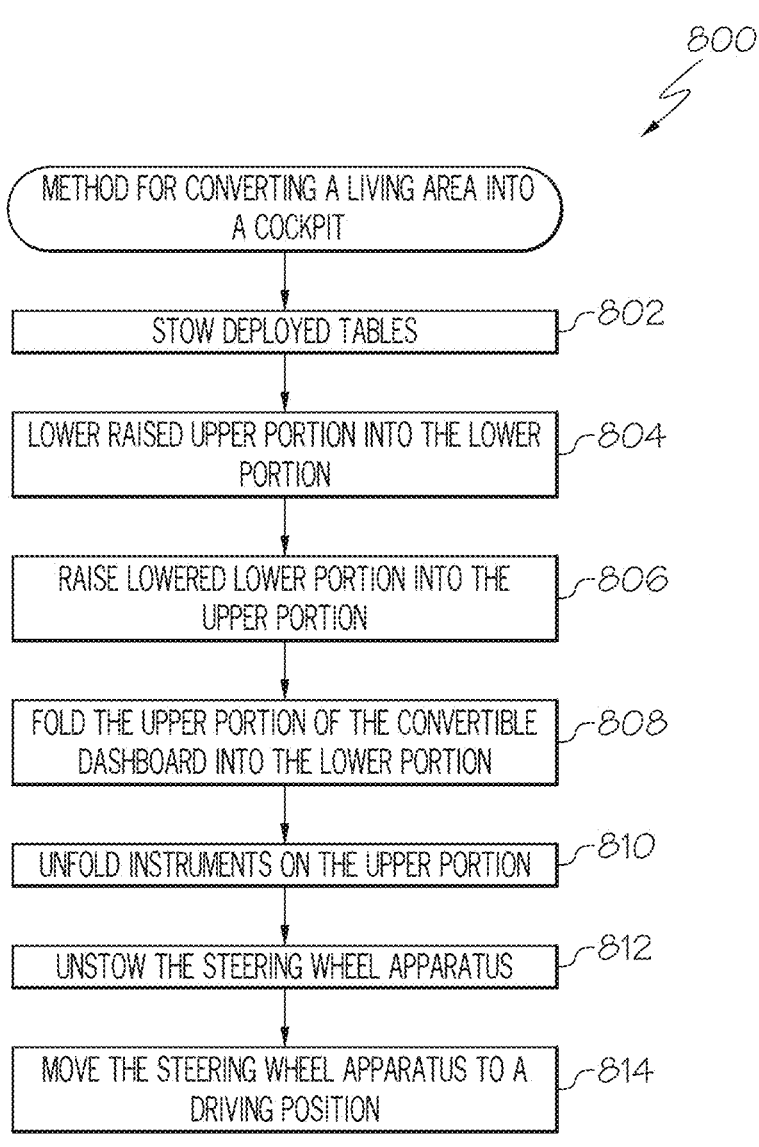

*800*

METHOD FOR CONVERTING A LIVING AREA INTO A COCKPIT

STOW DEPLOYED TABLES *~802*

LOWER RAISED UPPER PORTION INTO THE LOWER PORTION *~804*

RAISE LOWERED LOWER PORTION INTO THE UPPER PORTION *~806*

FOLD THE UPPER PORTION OF THE CONVERTIBLE DASHBOARD INTO THE LOWER PORTION *~808*

UNFOLD INSTRUMENTS ON THE UPPER PORTION *~810*

UNSTOW THE STEERING WHEEL APPARATUS *~812*

MOVE THE STEERING WHEEL APPARATUS TO A DRIVING POSITION *~814*

FIG. 8

CONVERTIBLE COCKPIT

CROSS-REFERENCE TO RELATED APPLICATIONS

This application claims the benefit of and priority to U.S. Provisional Patent Application No. 63/641,588, filed on May 2, 2024, the entire contents of which are hereby incorporated by reference.

BACKGROUND

Field

Aspects of the present disclosure relate to recreational vehicles, namely recreational vehicle (RV) cockpit areas.

Description of Related Art

An RV is a vehicle that can serve as both as a mode of transport as well as a living space. RVs are used for camping, cross-country travel, as well as for temporary or permanent living. RVs may include motorhomes (also known as motorized RVs) that can be driven like regular vehicles, and which also include a living area. RVs may also include towable RVs which can include travel trailers or campers that contain living quarters but do not have their own engines and are towed by another vehicle.

An RV's living area and cockpit are generally partitioned from one another and serve different uses: the cockpit is used while driving and the living area is used at any time by passengers, whether to rest or carry out non-driving activities. Common features of an RV and its living area may include sleeping quarters, a kitchen, a bathroom, a dining area, storage space, air conditioning, heating, power and water systems as well as other amenities such as generators, and waste systems.

SUMMARY

The present disclosure also relates to RVs. RVs encompassed by the present disclosure include motorized recreational vehicles, like motor homes and other vehicles with their own motor and drivetrain, and trailer-type recreational vehicles, which include fifth wheel trailers and other types of towable campers, toy haulers, etc.

RV living areas may range in square footage. Generally, the larger the living area the more comprehensive a drive train of the RV should be (e.g., requiring a larger battery or larger engine for propulsion). While a large living area is often desired by RV users, such that the RV user may have more storage and can house more passengers, the increased living area results in decreased fuel efficiency for the RV. As the living area becomes larger, the weight of the RV increases, increasing stress on the drive train of the RV increasing long-term maintenance costs or reducing the life of the RV. Moreover, as the living area becomes larger, the length of the RV increases and, thus, increases storage space needs (e.g., garage space) for the RV when the RV is not in use.

Thus, the present disclosure recognizes the benefit for conversion of the cockpit from a driving cockpit into a living space to increase the living area without increasing a weight or length of the RV by increasing square footage of the separate living areas.

The present disclosure is directed to a convertible cockpit of an RV such that the cockpit may be used as a living space, where the convertible cockpit converts from a driving cockpit configuration into a living space configuration. Embodiments of the convertible cockpit may be part of a recreational vehicle (RV) of a type having living quarters defined therein, the recreational vehicle including a chassis, an axle assembly coupled to the chassis and providing motive support and underbody clearance to the chassis, vehicle control components that control movement operations of the RV, a floor defining a lower limit of the living quarters, a vehicle body generally enclosing the living quarters, where the vehicle body and the floor are supported by the chassis; and a convertible cockpit having a driver position.

The convertible cockpit may include a convertible dashboard configurable to positions, the positions comprising a compressed position and an expanded position, where at least a portion of the dashboard is closer in distance on a longitudinal axis to the driver position in the compressed position than in the expanded position. Moreover, the convertible dashboard can include a slit portion for placing a steering wheel apparatus, where the slit portion runs on the longitudinal axis across a portion of the convertible dashboard, a steering wheel apparatus including a steering column or a steering wheel, where the steering wheel apparatus is movable along a length of the slit portion in several positions including a driving position or a stowing position, wherein the driving position comprises the steering wheel apparatus in a position facing the driver position and wherein the stowing position comprises the steering wheel apparatus facing away from the driver position. The convertible cockpit may also include a drive-by-wire system that couples the steering wheel apparatus to vehicle control components, where the drive-by-wire system allows free movement of the steering wheel apparatus along the slit portion.

It is noted that while the present disclosure specifically references RVs, the present disclosure may also be applied to the cockpit of any vehicle with driving controls including other cars, planes, etc.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 7 depicts an example method configured to perform a conversion of a convertible cockpit from a driving cockpit configuration to a living space configuration;

FIG. 8 depicts an example method configured to perform a conversion of a convertible cockpit from a living space configuration to a driving cockpit configuration.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
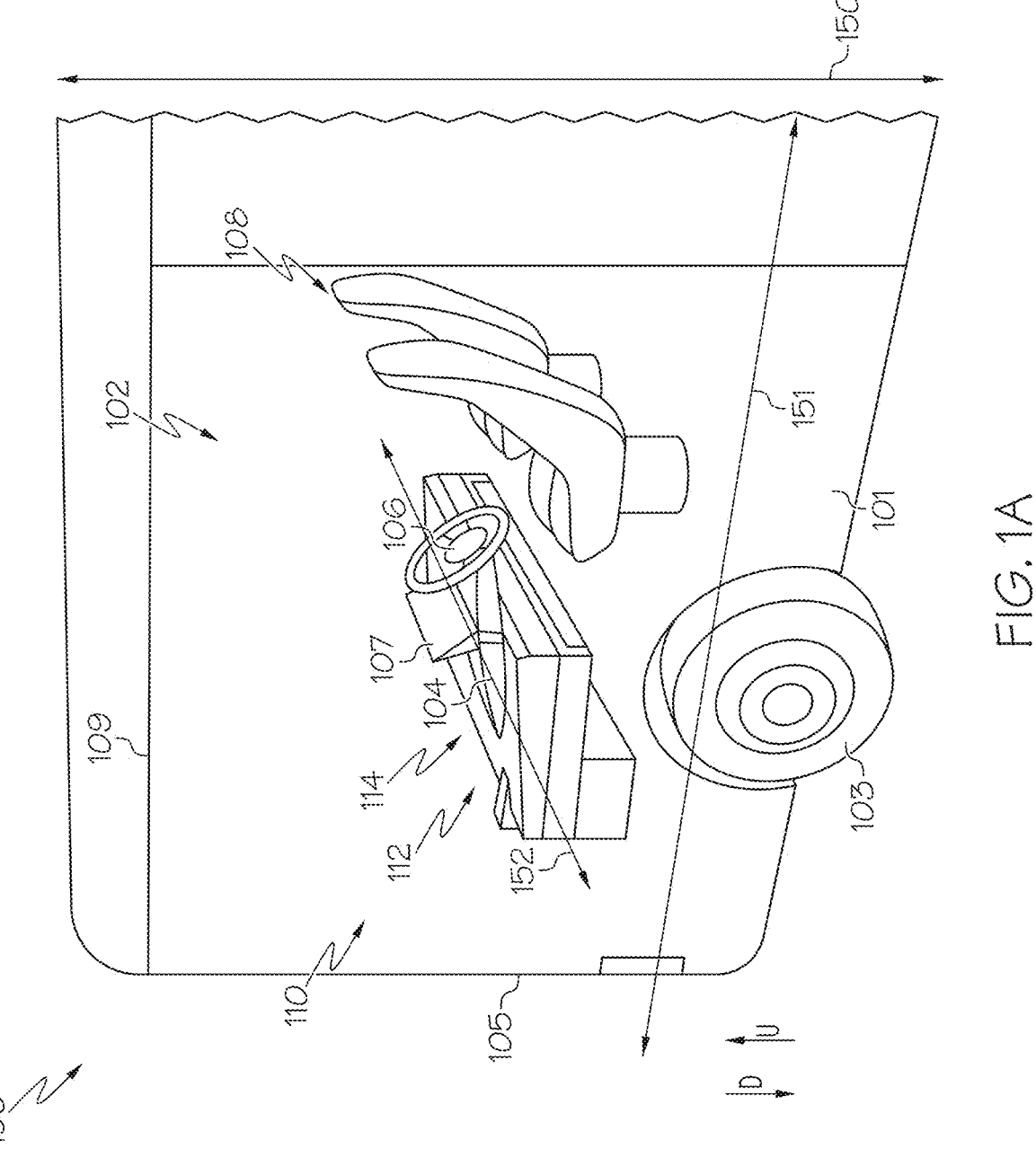
FIG. 1A is a perspective view of a convertible RV cockpit, according to one embodiment of the present disclosure.
Figure 1B:
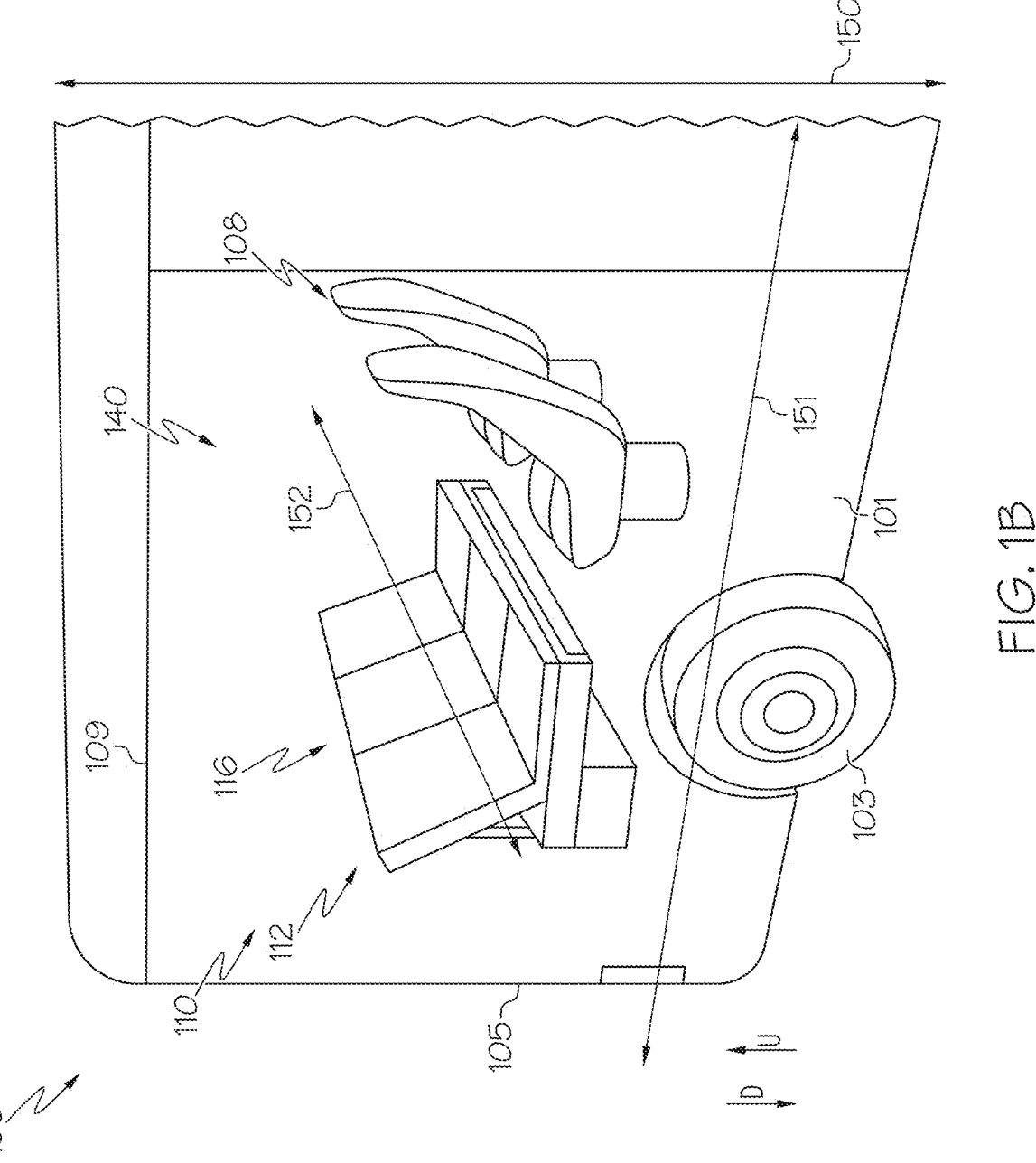
FIG. 1B is a perspective view of the convertible RV cockpit of FIG. 1A converted into a living space, according to one embodiment of the present disclosure.

FIGS. 1A and 1B depict an RV 100 with a convertible cockpit 110 in a driving cockpit configuration 102 and a living space configuration 140, respectively. As described herein, the convertible cockpit 110 may be converted from a driving cockpit configuration 102 to a living space configuration 140, and vice versa. The RV 100 includes wheels 103 and the convertible cockpit 110 includes a steering wheel apparatus that may include one or more of a steering column 104 and a steering wheel 106. For example, the steering column 104 may have a steering wheel 106 attached to it. In some embodiments the steering wheel 106 is detachable, for security reasons or for customization. The convertible cockpit 110 also includes vehicle seats 108 for a driver and an additional passenger. Thus, vehicle seats 108 include both a driver seat and at least one other other passenger seat. Also included are instruments 107 (e.g., speedometer, infotainment system, head unit, etc.) from which a driver may view information regarding the RV 100 systems and various RV controls. The steering wheel 106 and the instruments 107 extend from a convertible dashboard 112. As described herein a driver position may refer to a position of a driver seat of the one or more vehicle seats 108.

The convertible cockpit 110 may further include an RV floor 101 in a downwards direction (represented by D) on a vertical axis 150, and an RV roof 109 in an upwards direction (represented by U) on the vertical axis 150. A longitudinal axis 151 runs between a rear (not shown) of the RV 100 and a front 105 of the RV 100, where a forward direction moves from the rear of the RV 100 to the front 105 of the RV 100 along the longitudinal axis 151, and a backward direction runs from the front 105 of the RV 100 to the rear of the RV 100 along the longitudinal axis 151. A lateral axis 152 runs from one side of the RV 100 to the other opposite side of the RV 100, e.g., from one wall to an opposite wall or from one door to an opposite door.

Figure 2A:
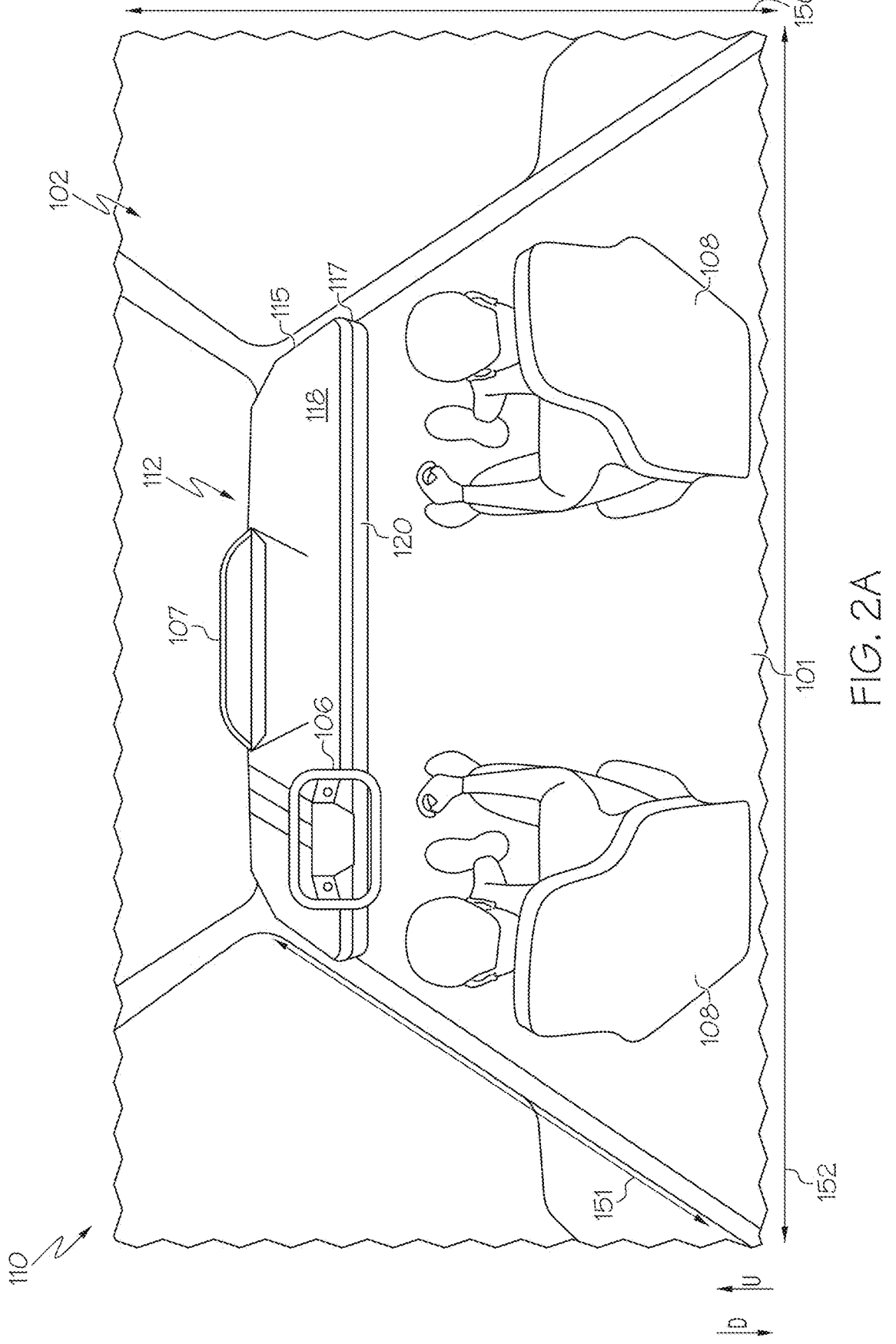
FIG. 2A is a rear view of a convertible RV cockpit in a driving cockpit configuration, according to one embodiment of the present disclosure.

Referring now to FIG. 2, a view of the convertible cockpit 110 of the RV 100 is shown. The convertible cockpit 110 may be implemented in other types of vehicles and is not limited to RVs. The convertible cockpit 110 includes the convertible dashboard 112, and the convertible dashboard 112 may include an upper portion 115 and a lower portion 117. The upper portion 115 and the lower portion 117 may move relative to one another, as explained further below.

Each of the upper portion 115 and the lower portion 117 includes an outer surface 118 and 120, respectively.

The convertible dashboard 112 may be in a compressed position 114 or an expanded position 116 (as depicted in FIG. 1A and FIG. 1B, respectively). The compressed position 114 corresponds with the convertible cockpit 210 being in a driving cockpit configuration 102, while the expanded position corresponds with the convertible cockpit 110 being in a living space configuration 140. Specifically, as depicted in FIG. 2, the driver and passenger may be sitting in the convertible cockpit 110 when the convertible dashboard 112 is in the compressed position 114. In the compressed position 114, a driver may utilize the steering wheel 106 and the instruments 107 while driving the RV. Although only the steering wheel 106 and the instruments 107 are depicted on the convertible dashboard 112, in embodiments, other components may be integrated into the convertible dashboard 112 in addition to the steering wheel apparatus and the instruments 107. The instruments 107 may include air-vents, additional screens, or controls placed on or integrated into the convertible dashboard 112.

Figure 3:
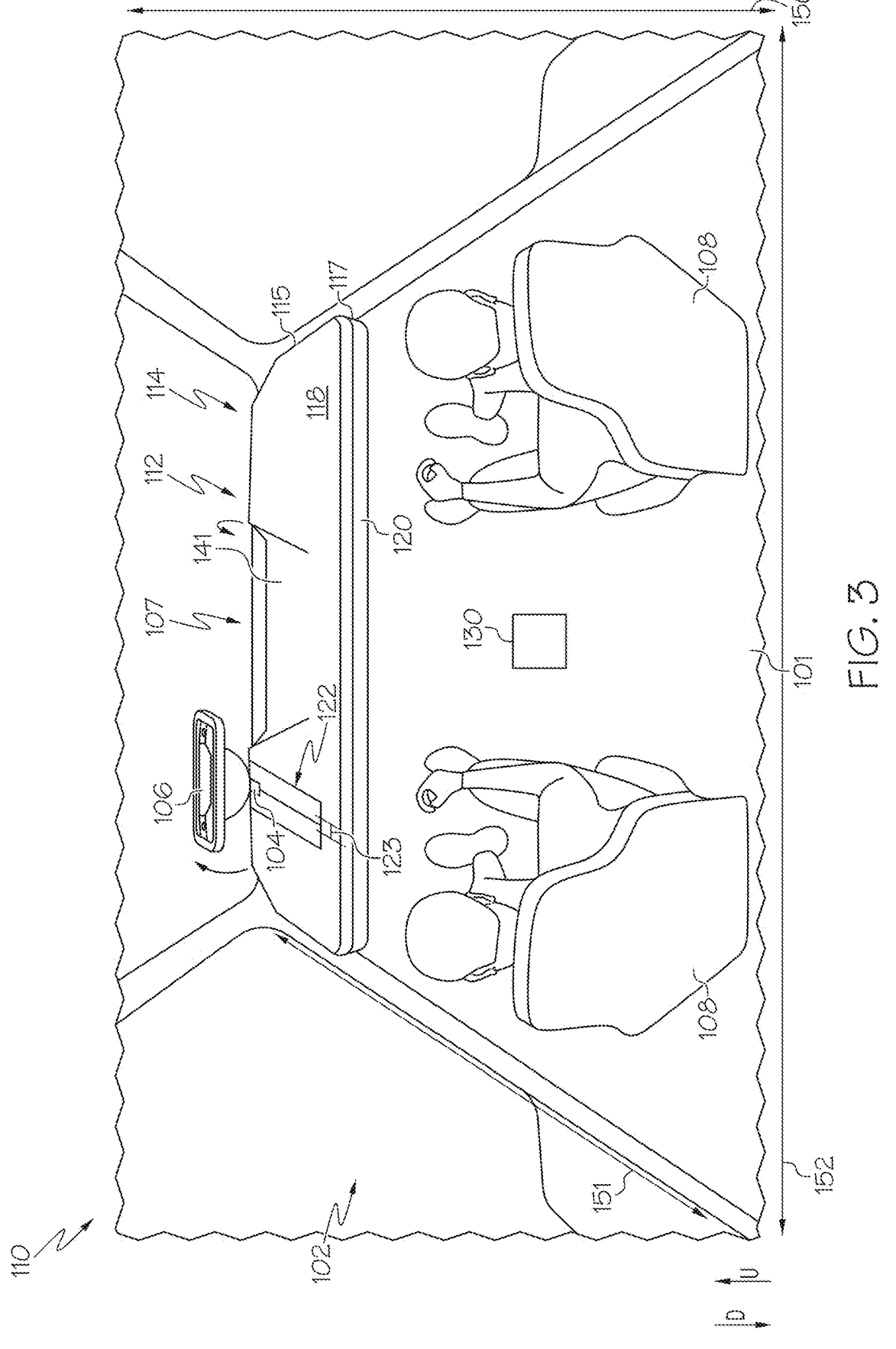
FIG. 3 is a rear view of the convertible RV cockpit of FIG. 2 in another driving cockpit configuration, according to one embodiment of the present disclosure.

FIG. 3 depicts a transitional phase of the convertible cockpit 110, where the convertible dashboard 112 is being converted from the compressed position 114 to the expanded position 116 (and the convertible cockpit 110 is being converted from the driving cockpit configuration 102 to the living space configuration 140). Specifically, as depicted in FIG. 3, the steering column 104 (with or without the steering wheel 106) and the instruments 107 are initially folded away from a driver position. As described herein, the driver position may describe or correspond to the position of one of the vehicle seats 108 where a driver may be seated. As such, the instruments 107 may be coupled to the convertible dashboard 112, e.g., hingedly or otherwise, such that the instruments 107 may fold with respect to the convertible dashboard 112. For example, the instruments 107 may fold behind the convertible dashboard 112 in a stowing position. In embodiments, the instruments 107 may fold toward the driver and passenger (e.g., fold towards a driver position) rather than away from the driver and passenger. The instruments 107 may have one or more axes of rotation with respect to the convertible dashboard 112 and convertible cockpit 110.

Figure 2B:
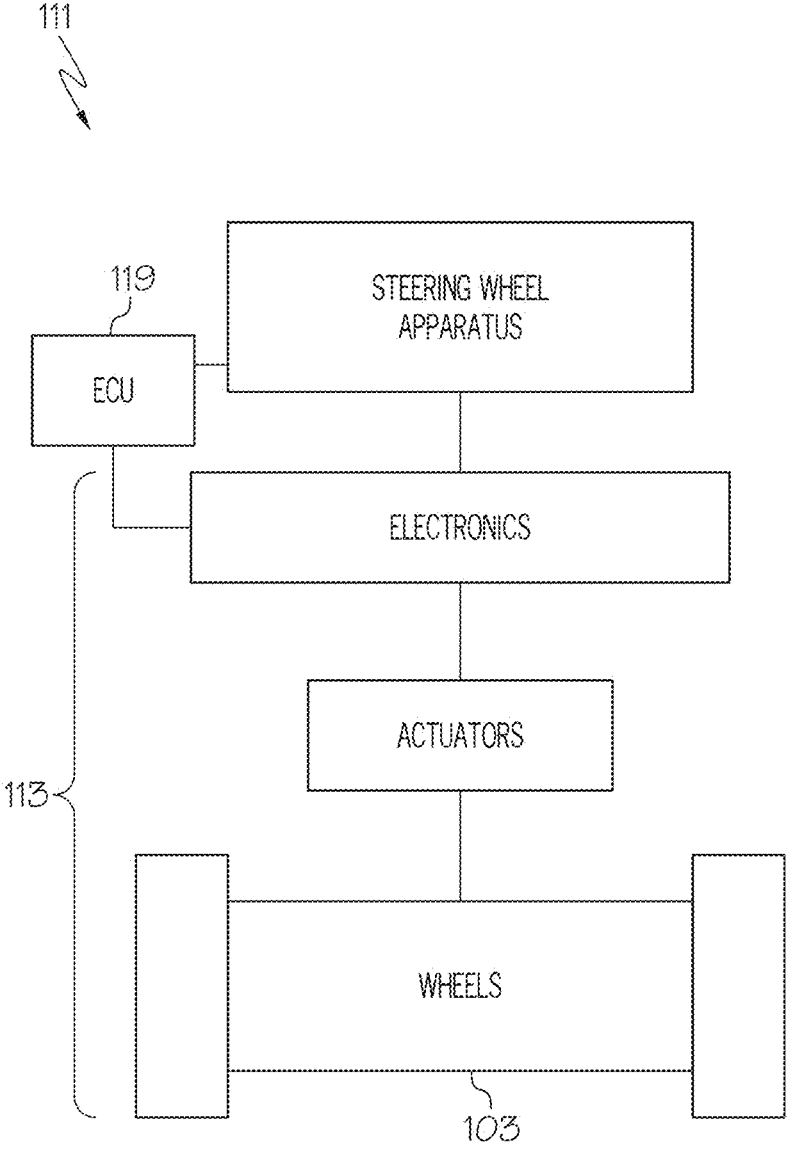
FIG. 2B depicts an example of a drive-by-wire system that can be used by an RV or vehicle to facilitate convertible cockpits, according to one embodiment of the present disclosure.

The steering column 104 may also be coupled to the convertible dashboard 112 or the RV floor 101 of the convertible cockpit 110, hingedly or otherwise. It is noted that traditional steering columns and steering wheels may not be foldable in manners described herein, as traditional steering column may be mechanically coupled to wheels to steer the RV. However, embodiments of the present disclosure utilize a drive-by-wire system 111 as depicted in FIG. 2B. The drive-by-wire system 111 couples the steering wheel apparatus (the steering column 104 or the steering wheel 106) to vehicle control components 113 such as electronics, actuators, or the wheels 103 via an electronic control 119 (e.g., a controller, an electronic control unit (ECU), processor, or machine-readable instructions, or combinations thereof) rather than through traditional mechanical means. As such, the steering column 104 does not have to be fixed in a single position using the drive-by-wire system 111. Rather, the drive-by-wire system 111 permits the steering wheel 106 and the steering column 104 to be moved in any direction. In some embodiments, a drive-by wire system is not used, but the connection between the steering wheel apparatus and vehicle control components 113 may be completely wireless and reliant upon wireless connectivity and technology.

Still referring to FIG. 3, the steering column 104 and steering wheel 106 may be moved along a slit portion 122 and fold away from the vehicle seats 108 within the slit portion 122 in a stowing position. The convertible dashboard 112 may include the slit portion 122 that extends along the convertible dashboard 112 near the steering column 104. The steering column 104 may slide along the slit portion 122 when the steering column 104 is folded away from the driver position, e.g., away from the vehicle seats 108. In embodiments, the slit portion 122 may be made of a different material than other portions of the convertible dashboard 112. Specifically, the slit portion 122 may be made of a flexible material to allow the steering column 104 to move within the slit portion 122. The slit portion 122 may be made of neoprene, rubber, or any other suitable material. The slit portion 122 may extend through the upper portion 115 and the lower portion 117 of the convertible dashboard 112, or only the upper portion 115 of the convertible dashboard 112.

The slit portion 122 may include a slit width 123. The slit width 123 may be substantially equal to a steering column width (not labeled), such that the steering column 104 may slide within the slit portion 122 with little resistance. In embodiments, the slit width 123 may be substantially less than the steering column width, such that the slit width 123 is nearly 2 inches, 1 inch, 0.5 inches, 0.1 inches, or 0 inches. In such embodiments, the slit portion 122 may expand as the steering column 104 is slid within the slit portion 122; the steering column 104 may still move within the slit portion 122 with little resistance in such embodiments, as the slit portion 122 is made of the flexible material that expands as the steering column 104 is slid within the slit portion 122.

In embodiments, the steering wheel 106 may be coupled to the steering column 104, e.g., hingedly or otherwise. As such, the steering wheel 106 may also fold away from the driver position into a stowing position. In examples, the steering wheel is folded upwardly and/or forwardly. As such, the steering wheel apparatus (including the steering column 104 or the steering wheel 106) may fold behind the convertible dashboard 112, similar to the instruments 107 being folded behind the convertible dashboard 112, as depicted in FIG. 3. A stowing position for the steering wheel apparatus or the instruments 107 may be any position where the steering wheel apparatus or the instruments 107 are moved or folded to allow cockpit conversion from one configuration to another (e.g., conversion between a driving cockpit configuration 102 and living space configuration 140) or to allow converting the dashboard between an expanded position 116 and compressed position 114. The steering column 104 may fold toward the driver and passenger (e.g., fold towards the driver position) rather than away from the driver and passenger. The steering column 104 may have one or more axes of rotation with respect to the convertible dashboard 112 and convertible cockpit 110. In some embodiments, the slit portion 122 may run to an end on the convertible dashboard 112 closest to the driver position and may allow the steering wheel apparatus or at least one of the steering wheel apparatus to fold downwards towards the RV floor 101 in a stowing position.

In embodiments, the instruments 107 may be fixedly coupled to the convertible dashboard 112, such that the instruments 107 do not fold away from the vehicle seats 108. In such embodiments, the convertible dashboard 112 may include an indentation 141. The indentation 141 may allow for the upper portion 115 of the convertible dashboard 112 to be folded upward (as discussed further below), even when the instruments 107 are fixedly coupled to the convertible dashboard 112, e.g., to place the instruments 107 on the indentation 141 or to fold the instruments 107 into the indentation 141. The indentation may define a recess in the outer surface 118 of the upper portion 115 or in the outer surface 120 of the lower portion 117.

The steering column 104, the steering wheel 106, and the instruments 107 may be folded manually or automatically. For example, the driver or passenger may manually fold the steering column 104, the steering wheel 106, and the instruments 107 away from the vehicle seats 108. Alternatively, controls 130 may exist within the convertible cockpit 110, such that the driver or passenger may initiate or control folding of the steering column 104, the steering wheel 106, or the instruments 107 using the controls 130. For example, the driver or passenger may select between different modes that convert the cockpit into different configurations, e.g., a selection of a mode may convert the convertible cockpit 110 from the driving cockpit configuration 102 to the living space configuration 140.

Figure 4:
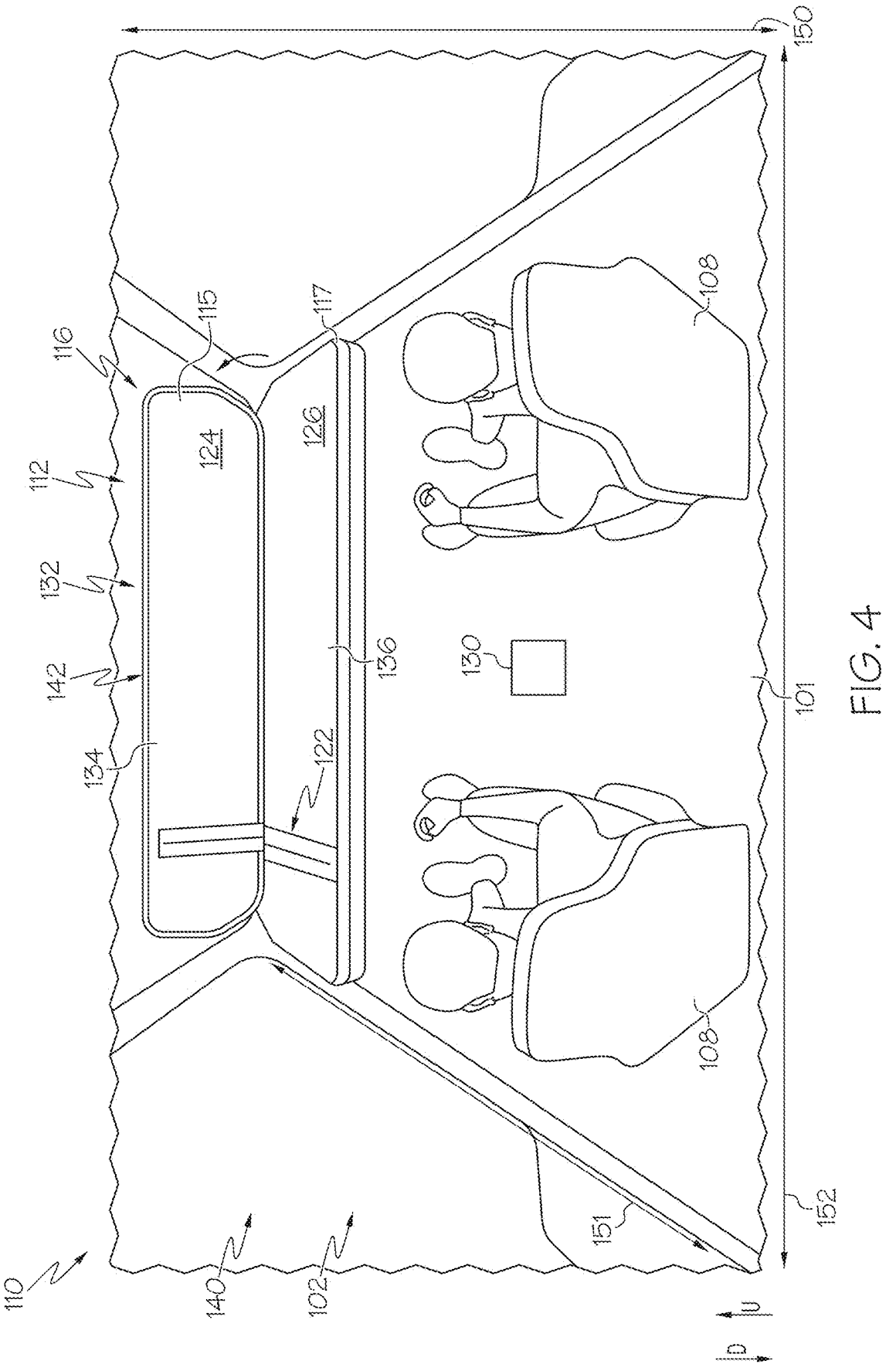
FIG. 4 is a rear view of the convertible RV cockpit of FIG. 2 in a living space configuration, according to one embodiment of the present disclosure.

Once the steering column 104, the steering wheel 106, and the instruments 107 are folded away from the vehicle seats 108, the upper portion 115 of the convertible dashboard 112 may be folded or raised upwards to extend generally on the vertical axis 150 and away from the lower portion 117 of the convertible dashboard 112. This converts the convertible dashboard 112 from the compressed position 114 to the expanded position 116, thereby exposing an inner surface 124 of the upper portion 115 and an inner surface 126 of the lower portion 117, as depicted in FIG. 4. As such, the upper portion 115 of the convertible dashboard 112 may be coupled to the lower portion 117 of the convertible dashboard 112, e.g., hingedly coupled, and may remain upright. The convertible cockpit 110 can thus be seen in a living space configuration 140.

In the expanded position 116, the upper portion 115 and the lower portion 117 of the convertible dashboard 112 may form a converted seat 132. The inner surface 124 of the upper portion 115 of the convertible dashboard 112 may be generally vertical and act as a seat back 134 of the converted seat 132, while the inner surface 126 of the lower portion 117 of the convertible dashboard 112 may be generally horizontal and act as a seat bottom 136 of the converted seat 132. The converted seat 132 allows for further passengers to occupy the convertible cockpit 110 of the RV 100, e.g., when the RV 100 is parked. As such, the convertible cockpit 110 may be converted into a living space configuration 140 through conversion of the convertible dashboard 112 into the converted seat 132. In embodiments, the upper portion 115 may further fold out to open up backwards in an open configuration or alternatively fold or slide behind the lower portion 117, where the converted seat 132 may act as a larger bench or bed along with the lower portion 117, or to allow the lower portion 117 to function as such while the upper portion 115 is folded behind the lower portion 117. In embodiments, the upper portion 115 is fixed in place and acts as a bench seat 142. The converted seat 132 may also serve as a bed or bed base on which a cushion or mattress is placed. It is also contemplated herein that the converted seat 132 may also be any other suitable seating configuration, such as bucket seats with a center console or a couch. For example, the inner surfaces 124, 126 may each be configured with cushioning, bedding, or padding.

Figure 5:
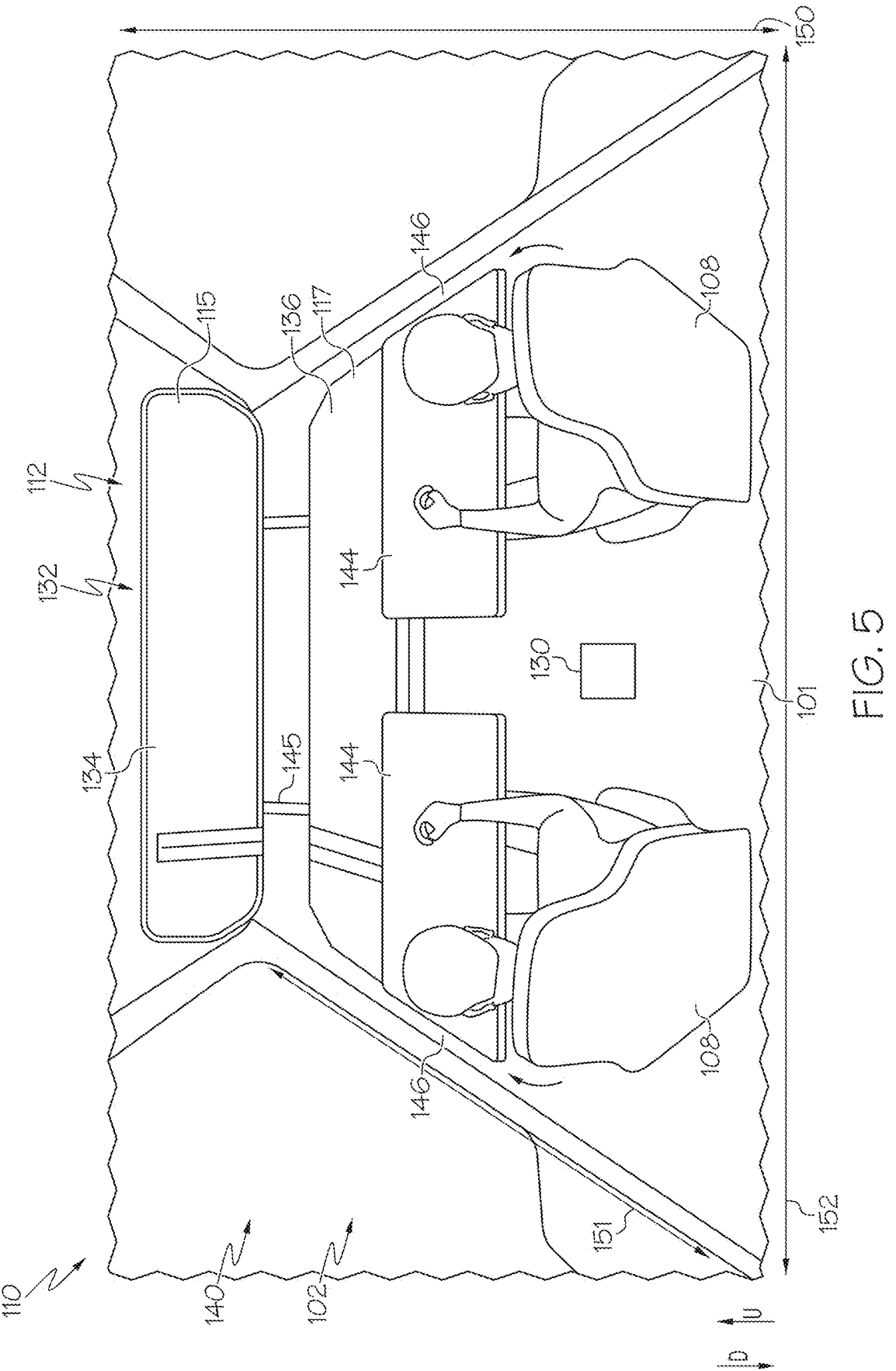
FIG. 5 is a rear view of the convertible RV cockpit of FIG. 2 in another living space configuration, according to one embodiment of the present disclosure.

Both the upper portion 115 and the lower portion 117 of the convertible dashboard 112 may also slide or extend in the upward direction U or the downward direction D along the vertical axis 150. For example, as depicted in FIG. 5, the lower portion 117 of the convertible dashboard (i.e., the seat bottom 136) may slide in the downward direction D toward the RV floor 101. The upper portion 115 of the convertible dashboard 112 (i.e., the seat back 134) may slide in the upward direction U toward the RV roof 109 via a sliding mechanism 145. Or both may occur together to increase the space.

Referring still to FIG. 5, the living space configuration 140 may further include one or more tables 144. The tables 144 may fold out upward and be positioned for use by the passengers when the convertible dashboard 112 is in the expanded position 116. The tables 144 may be coupled, e.g., slidably, via hinges, or otherwise, to sidewalls 146 or doors of the convertible cockpit 110. When not in use, the tables 144 may be stored against the sidewalls 146 or doors such that the tables 144 do not interfere with the driver's utilization of the steering wheel 106.

Figure 6:
FIG. 6 is a perspective view of a convertible RV cockpit, according to one embodiment of the present disclosure.

Referring now to FIG. 6, the vehicle seats 108 may be slidably coupled to a slide rail 143. The slide rail 143 may reposition the vehicle seats 108 within the convertible cockpit 110 and allow coupling of the vehicle seats 108 or additional vehicle seats 108 to other slide rails 143 to produce different seating arrangements. This gives the ability for the convertible cockpit 110 to seat passengers in a variety of configurations. The steering wheel 106 may also be slidably coupled to the slide rail 143, such that the steering wheel 106 and vehicle seat 108 may slide to the same position within the RV 100.

Now with reference to FIGS. 1-6 in conjunction with FIG. 7, which depicts an example method 700, the method 700 performs a conversion of a convertible cockpit 110 from a driving cockpit configuration 102 into a living space configuration 140, by converting a convertible dashboard 112 from a compressed position 114 to an expanded position 116. The method 700 may be performed manually or automatically. In optional embodiments, the method 700 is triggered or initiated electronically, e.g., via instructions from controls 130 to an ECU or a processing system.

The method 700 begins at block 702, with the convertible cockpit 110 in a driving cockpit configuration 102 as depicted by FIG. 2. At block 702 the steering wheel apparatus is moved away from a driver's position (e.g., a driver position on a vehicle seat 108) along the slit portion 122. The movement at block 702 may include moving the steering wheel apparatus through several positions along the slit portion 122 along the longitudinal axis 151. The steering wheel apparatus may be moved to an end of the slit portion 122 on an edge of the upper portion 115. In embodiments, the moving of the steering wheel apparatus at block 702 may include first unlocking the steering wheel apparatus, e.g., manually or automatically via controls 130.

In optional embodiments, the method 700 continues at block 704 to place the steering wheel apparatus into a stowing position. The stowing position may include folding the steering apparatus behind the convertible dashboard 112 or at one end of the slit portion 122. The stowing position may include placing the steering wheel 106 facing upwards in a specific position along the slit portion 122 or folded downwards towards the RV floor 101 at either end of the slit portion 122.

In optional embodiments, the method 700 at block 706 includes folding the instruments 107 away, behind the convertible dashboard 112, on the indentation 141 of the convertible dashboard in a stowing position or folded towards the driver position. Folding the instruments away at block 706 can include placing the instruments 107 in a stowing position.

The method 700 continues at block 708 with unfolding the upper portion 115 of the convertible dashboard 112. The unfolding may include moving the upper portion 115 in a direction away from the lower portion 117 and can also include clicking the upper portion 115 into place when it reaches a specific position. The unfolding at block 708 may also end with the upper portion 115 being fixed in place by one or more placement mechanisms, e.g., be hingedly fixed in place.

In optional embodiments, the method 700 at block 710 includes raising the upper portion 115 away from the lower portion 117 on the vertical axis 150 and towards the RV roof 109 fixing the upper portion 115 in a raised position.

In optional embodiments, the method 700 at block 712 includes lowering the lower portion 117 away from the upper portion 115 on the vertical axis 150 and towards to the RV floor 101 fixing the lower portion 117 in a lowered position.

Finally, in optional embodiments, the method 700 at block 714 includes deploying tables, which may include folding out tables 144, e.g., from the RV floor 101, walls, doors, from the inner surfaces 124, 126 of the convertible dashboard 112 or any other portion of the convertible cockpit 110 where tables 144 are stowed.

In embodiments, the vehicle seats 108 may also be moved or adjusted, e.g., via the slide rail 143, into another position or location within the cockpit or onto another slide rail 143.

Now with reference to FIGS. 1-6 in conjunction with FIG. 8, a method 800 performs a conversion of a living space configuration 140 into a driving cockpit configuration 102, by converting a convertible dashboard 112 from an expanded position 116 to a compressed position 114. The method 800 may be performed manually or automatically. In optional embodiments, the method 800 is triggered or initiated electronically, e.g., via instructions to an ECU or a processing system from a controller 130.

In optional embodiments, the method 800 may begin with stowing deployed tables 144. This could occur by folding the tables 144 or slidably stowing expanded tables into folded or compressed positions and stored. For example, the tables may be stowed on positions at the RV floor 101, sidewalls 146 or doors or any other portion of the convertible cockpit 110.

In optional embodiments, where the upper portion 115 is in a raised position, the method 800, may continue at block 804 to lower the upper portion 115 into the lower portion 117.

In optional embodiments, where the lower portion 117 is in a lowered position, the method 800, may continue at block 806 to raise the lower portion 117 into the upper portion 115.

The method 800 can begin at block 808 (if none of the optional blocks 802-806 apply) or may otherwise continue at block 808 with folding the upper portion 115 down into the lower portion 117 so that the inner surface 124 of the upper portion 115 faces or makes contact with the inner surface 126 of the lower portion 117.

In optional embodiments, the method 800 at block 810 includes unfolding folded instruments on the upper portion 815. For example, a folded screen may be unstowed and placed in a viewing position onto the upper portion 115.

The method 800 also includes unstowing the steering wheel apparatus at block 812. For example, if the steering wheel apparatus is folded behind the convertible dashboard 112, then it may be unfolded. Further, if the steering wheel apparatus is in a stowing position, it may be moved or unlocked from that position.

The method 800 concludes with moving the steering wheel apparatus into a driving position to allow its use by a driver. The steering wheel apparatus may click in place or otherwise be fixed in place in a position where it may be utilized.

In embodiments, the vehicle seats 108 may also be moved or adjusted, e.g., via the slide rails 143, into another position or location within the cockpit or another slide rail 143.

Figure 9:
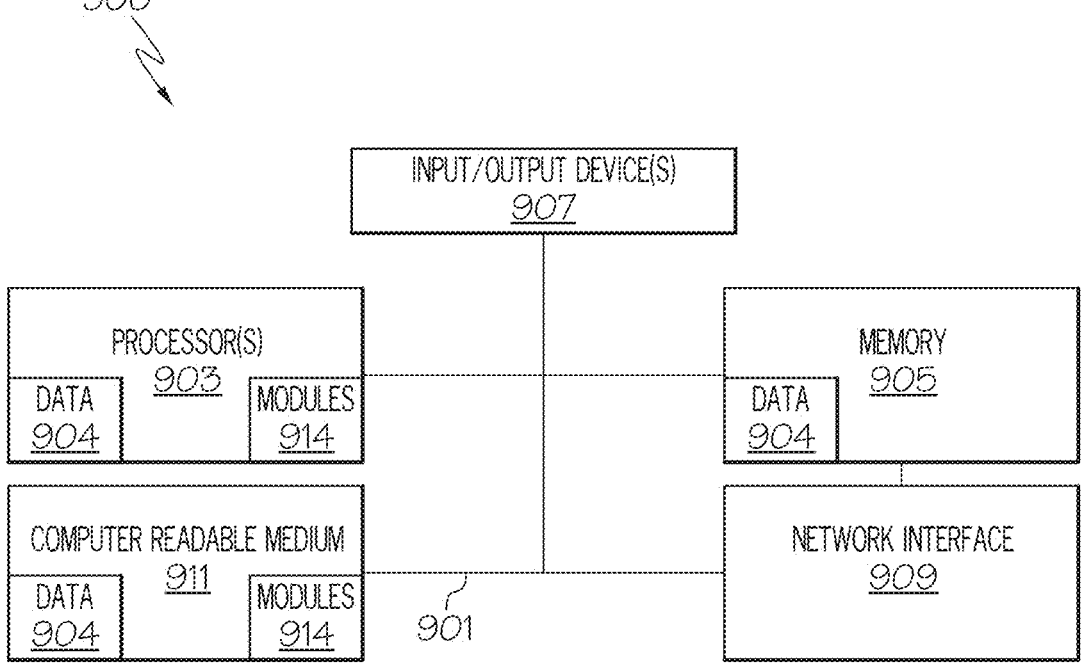
FIG. 9 depicts an example processing system configured to perform various aspects described herein including automated convertible cockpit conversions and controls.

FIG. 9 depicts an example processing system 900 configured to perform various aspects described herein, including, for example, methods 700-800 as described above with respect to FIGS. 7-8.

The processing system 900 is generally an example of an electronic device configured to execute computer-executable instructions, such as those derived from compiled computer code, including without limitation personal computers, tablet computers, servers, smart phones, vehicles, smart vehicles, smart devices, wearable devices, augmented, virtual reality devices, and others.

In the depicted example, processing system 900 includes one or more processors 903, one or more memory units 905, one or more input/output devices 907, e.g., one or more display or audio devices, one or more network interfaces 909 through which the one or more processors 903 is connected to one or more networks (e.g., a local network, an intranet, the Internet, or any other group of processing systems communicatively connected to each other), and computer-readable medium 911. In the depicted example, the aforementioned components are coupled by a bus 901, which may generally be configured for data exchange amongst the components. Bus 901 may be representative of multiple buses, while only one is depicted for simplicity.

The one or more processors 903 are generally configured to retrieve and execute instructions, e.g., data 904 stored in the one or more memories 905, including local memories, computer-readable medium 911, as well as remote memories and data stores. Similarly, the one or more processors 903 are configured to store application data residing in local memories like the computer-readable medium 912, as well as remote memories and data stores. The one or more processors 903 may run modules 914, e.g., a cockpit conversion module, a living area conversion module, a driving module, etc. M ore generally, the bus 901 is configured to transmit programming instructions and application data among the one or more processors 903, input/output devices(s) 907, network interface(s) 909, and the computer-readable medium 912. In certain embodiments, the one or more processors 903 are representative of a one or more central processing units (CPUs), graphics processing unit (GPUs), tensor processing unit (TPUs), accelerators, and other processing devices.

Input/output device(s) 907 may include any device, mechanism, system, interactive display, or various other hardware and software components for communicating information between processing system 900 and a user of processing system 900. For example, the input/output device(s) 907 may include input hardware, such as a keyboard, display, touch screen, button, vehicle controls, microphone, speaker, or other device for receiving inputs from the user and sending outputs to the user.

The network interface(s) 909 provide processing system 900 with access to external networks and thereby to external processing systems. The network interface(s) 909 can generally be any hardware or software capable of transmitting or receiving data via a wired or wireless network connection. Accordingly, the network interface(s) 909 can include a communication transceiver for sending or receiving any wired or wireless communication.

EXAMPLE CLAUSES

Implementation examples are described in the following numbered clauses:

Clause 1: A recreational vehicle (RV) of a type having living quarters defined therein, the recreational vehicle comprising a chassis; an axle assembly coupled to the chassis and providing motive support and underbody clearance to the chassis; vehicle control components that control movement operations of the RV; a floor defining a lower limit of the living quarters; a vehicle body generally enclosing the living quarters, the vehicle body and the floor being supported by the chassis; and a convertible cockpit having a driver position, comprising: a convertible dashboard configurable to positions, the of positions comprising a compressed position and an expanded position, at least a portion of the dashboard being closer in distance on a longitudinal axis to the driver position in the compressed position than in the expanded position, the convertible dashboard comprising a slit portion for placing a steering wheel apparatus, wherein the slit portion runs on the longitudinal axis across a portion of the convertible dashboard; a steering wheel apparatus comprising a steering column or a steering wheel, wherein the steering wheel apparatus is movable along a length of the slit portion in several positions comprising a driving position or a stowing position, wherein the driving position comprises the steering wheel apparatus in a position facing the driver position and wherein the stowing position comprises the steering wheel apparatus facing away from the driver position; and a drive-by-wire system that couples the steering wheel apparatus to vehicle control components, the drive-by-wire system allowing free movement of the steering wheel apparatus along the slit portion.

Clause 2: The RV of Clause 1, wherein the longitudinal axis runs between a rear of the RV and a front of the RV, wherein a forward direction moves from the rear of the RV to the front of the RV along the longitudinal axis, and a backward direction runs from the front of the RV to the rear of the RV along the longitudinal axis, and wherein a lateral axis runs between a first side of the RV to a second side of the RV.

Clause 3: The RV of any of Clauses 1-2, wherein the convertible cockpit further comprises one or more passenger seats, wherein the passenger seats comprise at least one driver seat defining the driver position.

Clause 4: The RV of any of Clauses 1-3, further comprising a slide rail, wherein the one or more passenger seats are slidably coupled to the slide rail.

Clause 5: The RV of any of Clauses 1-4, further comprising an RV roof and an RV floor.

Clause 6: The RV of any of Clauses 1-5, wherein the convertible cockpit comprises instruments for information viewing, RV control, audio outputs, air-vents, or screens.

Clause 7: The RV of any of Clauses 1-6, wherein the vehicle control components comprise wheels supporting the chassis.

Clause 8: The RV of any of Clauses 1-7, wherein the drive-by-wire system couples the steering wheel apparatus to the vehicle control components via electronic control.

Clause 9: The RV of any of Clauses 1-8, wherein a portion of the steering column is disposed in the slit portion, and the steering wheel is coupled to an exposed portion of the steering column.

Clause 10: The RV of any of Clauses 1-9, wherein the convertible dashboard is slidably movable in the forward direction or the backward direction.

Clause 11: The RV of any of Clauses 1-10, further comprising one or more stowable tables.

Clause 12: The RV of any of Clauses 1-11, wherein the convertible dashboard comprises an upper portion and a lower portion.

Clause 13: The RV of any of Clauses 1-12, wherein the upper portion and the lower portion are hingedly coupled to each other.

Clause 14: The RV of any of Clauses 1-13, wherein each of the upper portion and the lower portion comprise an inner surface and an outer surface, and wherein at least one of the upper portion or the lower portion comprises the slit portion.

Clause 15: The RV of any of Clauses 1-14, wherein the expanded position comprises the upper portion folded out away from the lower portion, wherein the inner surface of the upper portion does not face the inner surface of the lower portion.

Clause 16: The RV of any of Clauses 1-15, wherein the compressed position comprises the upper portion folded onto the lower portion, wherein the inner surface of the upper portion faces the inner surface of the lower portion.

Clause 17: The RV of any of Clauses 1-16, wherein at least one of the upper portion or the lower portion comprises an indentation, wherein the indentation defines a recess in the outer surface of the upper portion or in the outer surface of the lower portion.

Clause 18: The RV of any of Clauses 1-17, wherein in the expanded position, the upper portion is fixed in place in its folded-out position to act as a seat back, wherein the lower portion acts as a seat.

Clause 19: The RV of any of Clauses 1-18, wherein a tray or table slidably extends from the convertible dashboard in the expanded position.

Clause 20: The RV of any of Clauses 1-19, wherein to convert the convertible dashboard from the compressed position to the expanded position, the steering wheel apparatus is placed in the stowing position.

Clause 21: The RV of any of Clauses 1-20, wherein the stowing position comprises the steering wheel apparatus in a position at an end of the slit portion furthest away from the driver position.

Clause 22: The RV of any of Clauses 1-21, wherein the stowing position comprises the steering wheel apparatus in a position folded away behind the convertible dashboard.

Clause 23: The RV of any of Clauses 1-22, wherein the instruments are foldable in relation to the convertible dashboard.

Clause 24: The RV of any of Clauses 1-23, wherein at least one of the steering wheel or the steering column is detachable.

Clause 25: The RV of any of Clauses 1-24, wherein at least one of the inner surface of the upper portion or the inner surface of the lower portion comprises cushioning or pads.

Clause 26: A recreational vehicle (RV) of a type having living quarters defined therein, the recreational vehicle comprising a chassis; an axle assembly coupled to the chassis and providing motive support and underbody clearance to the chassis; vehicle control components that control movement operations of the RV; a floor defining a lower limit of the living quarters; a vehicle body generally enclosing the living quarters, the vehicle body and the floor being supported by the chassis; and a convertible cockpit having a driver position, comprising: a convertible dashboard configurable to positions, the of positions comprising a compressed position and an expanded position, at least a portion of the dashboard being closer in distance on a longitudinal axis to the driver position in the compressed position than in the expanded position, the convertible dashboard comprising a slit portion for placing a steering wheel apparatus, wherein the slit portion runs on the longitudinal axis across the convertible dashboard; and a steering wheel apparatus coupled to the slit portion, the steering wheel apparatus comprising a steering column or a steering wheel, wherein the steering wheel apparatus is movable along a length of the slit portion in several positionings comprising a driving position or a stowing position, wherein the driving position comprises the steering wheel apparatus in a position facing the driver position and wherein the stowing position comprises the steering wheel apparatus facing upwards.

Clause 27: The RV of Clause 26 further comprising a drive-by-wire system that couples the steering wheel apparatus to vehicle control components, the drive-by-wire system allows free movement of the steering wheel apparatus along the slit portion.

Clause 28: The RV of any of Clauses 26-27, wherein the longitudinal axis runs between a rear of the RV and a front of the RV, wherein a forward direction moves from the rear of the RV to the front of the RV along the longitudinal axis, and a backward direction runs from the front of the RV to the rear of the RV along the longitudinal axis, and wherein a lateral axis runs between a first side of the RV to a second side of the RV.

Clause 29: The RV of any of Clauses 26-28, wherein the convertible cockpit further comprises one or more passenger seats, wherein the passenger seats comprise at least one driver seat.

Clause 30: The RV of any of Clauses 26-29, further comprising a slide rail, wherein the one or more passenger seats are slidably coupled to the slide rail.

Clause 31: The RV of any of Clauses 26-30, further comprising an RV roof and an RV floor.

Clause 32: The RV of any of Clauses 26-31, wherein the convertible cockpit comprises instruments for information viewing, RV control, audio outputs, air-vents, or screens.

Clause 33: The RV of any of Clauses 26-32, wherein the vehicle control components comprise wheels.

Clause 34: The RV of any of Clauses 26-33, wherein the drive-by-wire system couples the steering wheel apparatus to the vehicle control components via electronic control.

Clause 35: The RV of any of Clauses 26-34, wherein a portion of the steering column is inserted into the slit, and the steering wheel is coupled to an exposed portion of the steering column.

Clause 36: The RV of any of Clauses 26-35, wherein the convertible dashboard is slidably movable in the forward direction or the backward direction.

Clause 37: The RV of any of Clauses 26-36, further comprising one or more stowable tables.

Clause 38: The RV of any of Clauses 26-37, wherein the convertible dashboard comprises an upper portion and a lower portion.

Clause 39: The RV of any of Clauses 26-38, wherein the upper portion and the lower portion are hingedly coupled to each other.

Clause 40: The RV of any of Clauses 26-39, wherein each of the upper portion and the lower portion comprise an inner surface and an outer surface, and wherein at least one of the upper portion or the lower portion comprises the slit portion.

Clause 41: The RV of any of Clauses 26-40, wherein the expanded position comprises the upper portion folded out away from the lower portion, wherein the inner surface of the upper portion does not face the inner surface of the lower portion.

Clause 42: The RV of any of Clauses 26-41, wherein the compressed position comprises the upper portion folded onto the lower portion, wherein the inner surface of the upper portion faces the inner surface of the lower portion.

Clause 43: The RV of any of Clauses 26-42, wherein at least one of the upper portion or the lower portion comprises an indentation.

Clause 44: The RV of any of Clauses 26-43, wherein in the expanded position, the upper portion is fixed in place in its folded-out position to act as a seat back, wherein the lower portion acts as a seat.

Clause 45: The RV of any of Clauses 26-44, wherein a tray or table slidably extends from the convertible dashboard in the expanded position.

Clause 46: The RV of any of Clauses 26-45, wherein to convert the convertible dashboard from the compressed position to the expanded position, the steering wheel apparatus is placed in the stowing position.

Clause 47: The RV of any of Clauses 26-46, wherein the stowing position comprises the steering wheel apparatus in a position at an end of the slit portion furthest away from the driver position.

Clause 48: The RV of any of Clauses 23-47, wherein stowing position comprises the steering wheel apparatus in a position folded away behind the convertible dashboard.

Clause 49: The RV of any of Clauses 23-48, wherein the instruments are foldable in relation to the convertible dashboard.

Clause 50: The RV of any of Clauses 23-49, wherein at least one of the steering wheel or the steering column is detachable.

Clause 51: The RV of any of Clauses 23-50, wherein at least one of the inner surface of the upper portion or the inner surface of the lower portion comprises cushioning or pads.

Clause 52: A vehicle comprising: a chassis; an axle assembly coupled to the chassis and providing motive support and underbody clearance to the chassis; vehicle control components that control movement operations of the vehicle; a convertible cockpit having a driver position, comprising: a convertible dashboard configurable to positions, the positions comprising a compressed position and an expanded position, at least a portion of the dashboard being closer in distance on a longitudinal axis to the driver position in the compressed position than in the expanded position, the convertible dashboard comprising a slit portion for placing a steering wheel apparatus, wherein the slit portion runs on the longitudinal axis across the convertible dashboard; and a steering wheel apparatus coupled to the slit portion, the steering wheel apparatus comprising a steering column or a steering wheel, wherein the steering wheel apparatus is movable along a length of the slit portion in several positionings comprising a driving position or a stowing position, wherein the driving position comprises the steering wheel apparatus in a position facing the driver position and wherein the stowing position comprises the steering wheel apparatus facing upwards.

Clause 53: The vehicle of Clause 52 further comprising a drive-by-wire system that couples the steering wheel apparatus to vehicle control components, the drive-by-wire system allows free movement of the steering wheel apparatus along the slit portion.

Clause 54: The vehicle of any of Clauses 52-53, wherein the longitudinal axis runs between a rear of the RV and a front of the RV, wherein a forward direction moves from the rear of the RV to the front of the RV along the longitudinal axis, and a backward direction runs from the front of the RV to the rear of the RV along the longitudinal axis, and wherein a lateral axis runs between a first side of the RV to a second side of the RV.

Clause 55: The vehicle of any of Clauses 52-54, wherein the convertible cockpit further comprises one or more passenger seats, wherein the passenger seats comprise at least one driver seat.

Clause 56: The vehicle of any of Clauses 52-55, further comprising a slide rail, wherein the one or more passenger seats are slidably coupled to the slide rail.

Clause 57: The vehicle of any of Clauses 52-56, further comprising an RV roof and an RV floor.

Clause 58: The vehicle of any of Clauses 52-57, wherein the convertible cockpit comprises instruments for information viewing, RV control, audio outputs, air-vents, or screens.

Clause 59: The vehicle of any of Clauses 52-58, wherein the vehicle control components comprise wheels.

Clause 60: The vehicle of any of Clauses 52-59, wherein the drive-by-wire system couples the steering wheel apparatus to the vehicle control components via electronic control.

Clause 61: The vehicle of any of Clauses 52-60, wherein a portion of the steering column is inserted into the slit, and the steering wheel is coupled to an exposed portion of the steering column.

Clause 62: The vehicle of any of Clauses 52-61, wherein the convertible dashboard is slidably movable in the forward direction or the backward direction.

Clause 63: The vehicle of any of Clauses 52-62, further comprising one or more stowable tables.

Clause 64: The vehicle of any of Clauses 52-63, wherein the convertible dashboard comprises an upper portion and a lower portion.

Clause 65: The vehicle of any of Clauses 52-64, wherein the upper portion and the lower portion are hingedly coupled to each other.

Clause 66: The vehicle of any of Clauses 52-65, wherein each of the upper portion and the lower portion comprise an inner surface and an outer surface, and wherein at least one of the upper portion or the lower portion comprises the slit portion.

Clause 67: The vehicle of any of Clauses 52-66, wherein the expanded position comprises the upper portion folded out away from the lower portion, wherein the inner surface of the upper portion does not face the inner surface of the lower portion.

Clause 68: The vehicle of any of Clauses 52-67, wherein the compressed position comprises the upper portion folded onto the lower portion, wherein the inner surface of the upper portion faces the inner surface of the lower portion.

Clause 69: The vehicle of any of Clauses 52-68, wherein at least one of the upper portion or the lower portion comprises an indentation.

Clause 70: The vehicle of any of Clauses 52-69, wherein in the expanded position, the upper portion is fixed in place in its folded-out position to act as a seat back, wherein the lower portion acts as a seat.

Clause 71: The vehicle of any of Clauses 52-70, wherein a tray or table slidably extends from the convertible dashboard in the expanded position.

Clause 72: The vehicle of any of Clauses 52-71, wherein to convert the convertible dashboard from the compressed position to the expanded position, the steering wheel apparatus is placed in the stowing position.

Clause 73: The vehicle of any of Clauses 52-72, wherein the stowing position comprises the steering wheel apparatus in a position at an end of the slit portion furthest away from the driver position.

Clause 74: The vehicle of any of Clauses 52-73, wherein the stowing position comprises the steering wheel apparatus in a position folded away behind the convertible dashboard.

Clause 75: The RV of any of Clauses 52-74, wherein the instruments are foldable in relation to the convertible dashboard.

Clause 76: The RV of any of Clauses 52-75, wherein at least one of the steering wheel or the steering column is detachable.

Clause 77: The RV of any of Clauses 52-76, wherein at least one of the inner surface of the upper portion or the inner surface of the lower portion comprises cushioning or pads.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, unless stated otherwise, the term "or" is used in an inclusive sense. This inclusive usage of or is equivalent to "and/or". Thus, when options are delineated using "or," it permits the selection of one or more of the enumerated options concurrently. For example, if the document stipulates that a component may comprise option A or option B, it shall be understood to mean that the component may comprise option A, option B, or both option A and option B, and does not mean, unless stated expressly that the component includes either option A or option B. This inclusive interpretation ensures that all potential combinations of the options are permissible, rather than restricting the choice to a singular, exclusive option.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (A SIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A recreational vehicle (RV) having living quarters defined therein, the recreational vehicle comprising:

a chassis;

an axle assembly coupled to the chassis and providing motive support and underbody clearance to the chassis;

vehicle control components that control movement operations of the RV;

a floor defining a lower limit of the living quarters;

a vehicle body generally enclosing the living quarters and a convertible cockpit, the vehicle body and the floor being supported by the chassis; and the convertible cockpit having a driver position, the convertible cockpit comprising:

a convertible dashboard configurable to positions, the positions comprising a compressed position and an expanded position, at least a portion of the dashboard being closer in distance on a longitudinal axis to the driver position in the compressed position than in the expanded position, the convertible dashboard comprising a slit portion for placing a steering wheel apparatus, wherein the slit portion runs on the longitudinal axis across a portion of the convertible dashboard;

a steering wheel apparatus comprising a steering column or a steering wheel, wherein the steering wheel apparatus is movable along a length of the slit portion between a driving position and a stowing position, wherein the driving position comprises the steering wheel apparatus in a position facing the driver position and wherein the stowing position comprises the steering wheel apparatus facing away from the driver position; and a drive-by-wire system that couples the steering wheel apparatus to the vehicle control components, the drive-by-wire system allowing free movement of the steering wheel apparatus along the slit portion.

2. The RV of claim 1, wherein the convertible cockpit further comprises one or more passenger seats, wherein the passenger seats comprise a driver seat defining the driver position.

3. The RV of claim 2, further comprising a slide rail, wherein the one or more passenger seats are slidably coupled to the slide rail.

4. The RV of claim 1, wherein the convertible cockpit comprises instruments for information viewing, RV control, audio outputs, air-vents, or screens.

5. The RV of claim 4, wherein the instruments are foldable in relation to the convertible dashboard.

6. The RV of claim 1, wherein the vehicle control components comprise wheels supporting the chassis.

7. The RV of claim 1, wherein the drive-by-wire system couples the steering wheel apparatus to the vehicle control components via electronic control.

8. The RV of claim 1, wherein a portion of the steering column is disposed in the slit portion, and the steering wheel is coupled to an exposed portion of the steering column.

9. The RV of claim 1, wherein the convertible dashboard is slidably movable in a forward direction or a backward direction, wherein the longitudinal axis runs between a rear of the RV and a front of the RV, wherein the forward direction moves from the rear of the RV to the front of the RV along the longitudinal axis, and the backward direction runs from the front of the RV to the rear of the RV along the longitudinal axis, and wherein a lateral axis runs between a first side of the RV and a second side of the RV.

10. The RV of claim 1, wherein at least one of the steering wheel or the steering column is detachable.

11. The RV of claim 1, wherein the convertible dashboard comprises an upper portion and a lower portion, wherein the upper portion and the lower portion are hingedly coupled to each other.

12. The RV of claim 11, wherein at least one of the upper portion or the lower portion comprises the slit portion.

13. The RV of claim 11, wherein each of the upper portion and the lower portion comprise an inner surface and an outer surface, and at least one of the inner surface of the upper portion or the inner surface of the lower portion comprises cushioning or pads.

14. The RV of claim 11, wherein:

each of the upper portion and the lower portion comprise an inner surface and an outer surface;

in the expanded position the upper portion is folded out away from the lower portion and the inner surface of the upper portion does not face the inner surface of the lower portion; and in the compressed position the upper portion is folded onto the lower portion and the inner surface of the upper portion faces the inner surface of the lower portion.

15. The RV of claim 12, wherein at least one of the upper portion or the lower portion comprises an indentation, wherein the indentation defines a recess in the outer surface of the upper portion or in the outer surface of the lower portion.

16. The RV of claim 11, wherein in the expanded position, the upper portion is fixed in place in a generally vertical folded-out position to act as a seat back, wherein an inner surface of the lower portion is generally horizontal and acts as a seat.

17. The RV of claim 1, wherein a tray or table slidably extends from the convertible dashboard in the expanded position.

18. The RV of claim 1, wherein to convert the convertible dashboard from the compressed position to the expanded position, the steering wheel apparatus is placed in the stowing position, wherein the stowing position comprises at least one of the steering wheel apparatus being in a position at an end of the slit portion furthest away from the driver position or the steering wheel apparatus in a position folded away behind the convertible dashboard.

19. The RV of claim 1, wherein the compressed position corresponds to the convertible cockpit being in a driving cockpit configuration and wherein the expanded position corresponds to the convertible cockpit being in a living space configuration.

20. A recreational vehicle (RV) having living quarters defined therein, the recreational vehicle comprising:

a chassis;

an axle assembly coupled to the chassis and providing motive support and underbody clearance to the chassis;

vehicle control components that control movement operations of the RV;

a floor defining a lower limit of the living quarters;

a vehicle body generally enclosing the living quarters and a convertible cockpit, the vehicle body and the floor being supported by the chassis; and the convertible cockpit having a driver position, the convertible cockpit comprising:

a convertible dashboard configurable to positions, the positions comprising a compressed position and an expanded position, at least a portion of the dashboard being closer in distance on a longitudinal axis to the driver position in the compressed position than in the expanded position, the convertible dashboard comprising a slit portion for placing a steering wheel apparatus, wherein the slit portion runs on the longitudinal axis across a portion of the convertible dashboard; and a steering wheel apparatus comprising a steering column or a steering wheel, wherein the steering wheel apparatus is movable along a length of the slit portion in between a driving position or a stowing position, wherein the driving position comprises the steering wheel apparatus in a position facing the driver position and wherein the stowing position comprises the steering wheel apparatus facing away from the driver position.

21. A vehicle comprising:

a chassis;

an axle assembly coupled to the chassis and providing motive support and underbody clearance to the chassis;

a vehicle body generally enclosing a convertible cockpit;

vehicle control components that control movement operations of the vehicle; and the convertible cockpit having a driver position, the convertible cockpit comprising:

a convertible dashboard configurable to positions, the positions comprising a compressed position and an expanded position, at least a portion of the dashboard being closer in distance on a longitudinal axis to the driver position in the compressed position than in the expanded position, the convertible dashboard comprising a slit portion for placing a steering wheel apparatus, wherein the slit portion runs on the longitudinal axis across a portion of the convertible dashboard; and a steering wheel apparatus comprising a steering column or a steering wheel, wherein the steering wheel apparatus is movable along a length of the slit portion in between a driving position or a stowing position, wherein the driving position comprises the steering wheel apparatus in a position facing the driver position and wherein the stowing position comprises the steering wheel apparatus facing away from the driver position.

\* \* \* \* \*